United States Patent
Lee et al.

(10) Patent No.: US 12,536,985 B2
(45) Date of Patent: Jan. 27, 2026

(54) SOUND-MITIGATING DEVICE FOR A DUCT SYSTEM

(71) Applicant: Toyota Motor Engineering & Manufacturing North America, Inc., Plano, TX (US)

(72) Inventors: Taehwa Lee, Ann Arbor, MI (US); Ayrton Ackerman, Ann Arbor, MI (US); Taesoo Kim, Ann Arbor, MI (US); Takumi J. Jinmon, Ann Arbor, MI (US); Ercan Mehmet Dede, Ann Arbor, MI (US); Danil V. Prokhorov, Canton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 321 days.

(21) Appl. No.: 18/113,298

(22) Filed: Feb. 23, 2023

(65) Prior Publication Data

US 2024/0292152 A1    Aug. 29, 2024

(51) Int. Cl.
   *G10K 11/16* (2006.01)
   *F16L 55/033* (2006.01)
   *G10K 11/172* (2006.01)

(52) U.S. Cl.
   CPC .......... *G10K 11/16* (2013.01); *F16L 55/0336* (2013.01); *G10K 11/161* (2013.01); *G10K 11/172* (2013.01)

(58) Field of Classification Search
   CPC .. F24F 13/24; F24F 13/02; F24F 7/04; G10K 11/172; G10K 11/16; G10K 11/162;
   (Continued)

(56) References Cited

U.S. PATENT DOCUMENTS

| 4,327,817 A | 5/1982 | Scarton et al. |
| 5,869,792 A * | 2/1999 | Allen ................. F16L 55/0333 |
| | | 181/224 |

(Continued)

FOREIGN PATENT DOCUMENTS

| DE | 732733 C | 3/1943 |
| EP | 1375848 A1 | 1/2004 |

(Continued)

OTHER PUBLICATIONS

3M Fire Barrier Pass-Through Device [online]. 3M Company, dated 2015, archived Jan. 2021 at <https://web.archive.org/web/20210117192700/https://multimedia.3m.com/mws/media/1221606O/3m-fire-barrier-pass-through-device-installation-guide.pdf> (Year: 2021).*

(Continued)

*Primary Examiner* — Fan S Tsang
*Assistant Examiner* — Sean M Rinehart
(74) *Attorney, Agent, or Firm* — Christopher G. Darrow; Darrow Mustafa PC (57) ABSTRACT

A duct includes a duct body. The duct body defines an inlet, an outlet, and a channel connecting the inlet and the outlet. The duct body is configured to direct gas flowing within the channel from the inlet to the outlet. The duct body further defines an opening located between the inlet and the outlet. The duct also includes a noise attenuator. The noise attenuator includes sound-absorbing material covering the opening. The sound-absorbing material has an outer face in direct contact with an external environment of the duct body. The sound-absorbing material is configured to dissipate acoustic energy within the channel.

21 Claims, 9 Drawing Sheets

(58) Field of Classification Search
CPC ...... F01N 1/00; F01N 1/02; F01N 1/22; F16L 55/033; F16L 55/0336
USPC ...................................................... 381/71.5
See application file for complete search history.

(56) References Cited

U.S. PATENT DOCUMENTS

| | | | |
|---|---|---|---|
| 6,983,820 B2 | 1/2006 | Boast et al. | |
| 6,988,057 B2 | 1/2006 | Huang et al. | |
| 7,278,514 B1 | 10/2007 | Quigley | |
| 7,293,627 B2 | 11/2007 | Kruger et al. | |
| 7,448,469 B2 | 11/2008 | Seyler et al. | |
| 7,556,123 B2 | 7/2009 | Ido et al. | |
| 8,087,493 B2 | 1/2012 | Kempf et al. | |
| 8,408,357 B2 | 4/2013 | Cheung | |
| 9,010,485 B2 | 4/2015 | Bornemann et al. | |
| 9,121,374 B2 | 9/2015 | Denker et al. | |
| 9,625,077 B2 | 4/2017 | Barbolini et al. | |
| 9,749,735 B1* | 8/2017 | Silver | H04R 1/2811 |
| 10,386,065 B2 | 8/2019 | Liu | |
| 10,900,449 B2 | 1/2021 | Shin et al. | |
| 2005/0252716 A1 | 11/2005 | Moenssen et al. | |
| 2009/0178879 A1* | 7/2009 | Park | F02M 35/1272 181/224 |
| 2011/0074067 A1 | 3/2011 | Khami et al. | |
| 2016/0097315 A1 | 4/2016 | Becker et al. | |
| 2016/0195049 A1* | 7/2016 | Zirkelbach | F02M 35/10 29/890.08 |
| 2018/0372038 A1* | 12/2018 | McCann | F02M 35/10091 |
| 2019/0024936 A1* | 1/2019 | Richie | F24F 13/085 |
| 2020/0066245 A1 | 2/2020 | Lee et al. | |
| 2020/0088144 A1 | 3/2020 | Sanchez | |
| 2020/0284529 A1 | 9/2020 | Lee et al. | |
| 2021/0301965 A1 | 9/2021 | Lee et al. | |
| 2021/0324623 A1* | 10/2021 | Albanese | E04G 17/0644 |

FOREIGN PATENT DOCUMENTS

| | | |
|---|---|---|
| JP | 2007192262 A | 8/2007 |
| JP | 4115021 B2 | 7/2008 |
| JP | 2020070954 A | 5/2020 |
| KR | 20140082113 A | 7/2014 |

OTHER PUBLICATIONS

Selamet, A. et al., "Helmholtz resonator lined with absorbing material," J. Acoust. Soc. Am. 117 (2), Feb. 2005, pp. 725-733 (9 pages).
Wang, X. et al., "Wave propagation in a duct with a periodic Helmholtz resonators array," J. Acoust. Soc. Am. 131 (2), Feb. 2012, pp. 1172-1182 (11 pages).
Lee et al., U.S. Appl. No. 17/829,969, filed Jun. 1, 2022.

* cited by examiner

SOUND-MITIGATING DEVICE FOR A DUCT SYSTEM

TECHNICAL FIELD

The present disclosure relates generally to sound mitigating devices and, more particularly, to sound mitigating devices for duct systems.

BACKGROUND

Duct systems prone to high-frequency noise propagation typically include foam materials to dissipate sound waves traveling through the duct. These foam materials may line a majority of the inside of the duct or the outside of the duct. However, the use of significant amounts of foam can cause the duct to become heavy and/or costly. The present disclosure addresses issues related to the use of significant amounts of foam to dissipate sound traveling through a duct.

SUMMARY

This section provides a general summary of the disclosure and is not a comprehensive disclosure of its full scope or all of its features.

In one form of the present disclosure, a duct includes a duct body. The duct body defines an inlet, an outlet, and a channel connecting the inlet and the outlet. The duct body is configured to direct gas flowing within the channel from the inlet to the outlet. The duct body further defines an opening located between the inlet and the outlet. The duct also includes a noise attenuator. The noise attenuator includes sound-absorbing material covering the opening. The sound-absorbing material has an outer face in direct contact with an external environment of the duct. The sound-absorbing material is configured to dissipate acoustic energy within the channel.

In another form of the present disclosure, a duct includes a duct body. The duct body defines an inlet, an outlet, and a channel connecting the inlet and the outlet. The duct body is configured to direct gas flowing within the channel from the inlet to the outlet. The duct body further defines an opening located between the inlet and the outlet. The duct also includes a noise attenuator. The noise attenuator includes sound-absorbing material covering the opening. The sound-absorbing material has an outer face in direct contact with an external environment of the duct body. The sound-absorbing material is configured to dissipate acoustic energy within the channel. The duct further includes an acoustic resonator. The acoustic resonator is located downstream of the noise attenuator. The acoustic resonator is configured to further dissipate acoustic energy within the channel. The acoustic resonator is at least one of a quarter-wavelength resonator and a Helmholtz resonator.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DETAILED DESCRIPTION

The present disclosure provides a sound-mitigating device for a duct system. The duct system includes a duct. The duct includes a duct body defining an inlet, an outlet, and a channel connecting the inlet and the outlet. The duct body is configured to direct gas flowing within the channel from the inlet to the outlet and further defines an opening located between the inlet and the outlet. The duct also includes a noise attenuator including sound-absorbing material covering the opening. The sound-absorbing material has an outer face in direct contact with an external environment of the duct. The sound-absorbing material is configured to absorb acoustic energy within the channel. In one or more arrangements, the duct also includes an acoustic resonator. The acoustic resonator is located downstream of the noise attenuator and is configured to reflect acoustic energy within the channel. The noise attenuator and the acoustic resonator may be configured for resonance coupling to dissipate acoustic energy within the channel. In some instances, the duct is a component of an HVAC system and is configured to mitigate noise produced by the HVAC system.

Figure 1A:
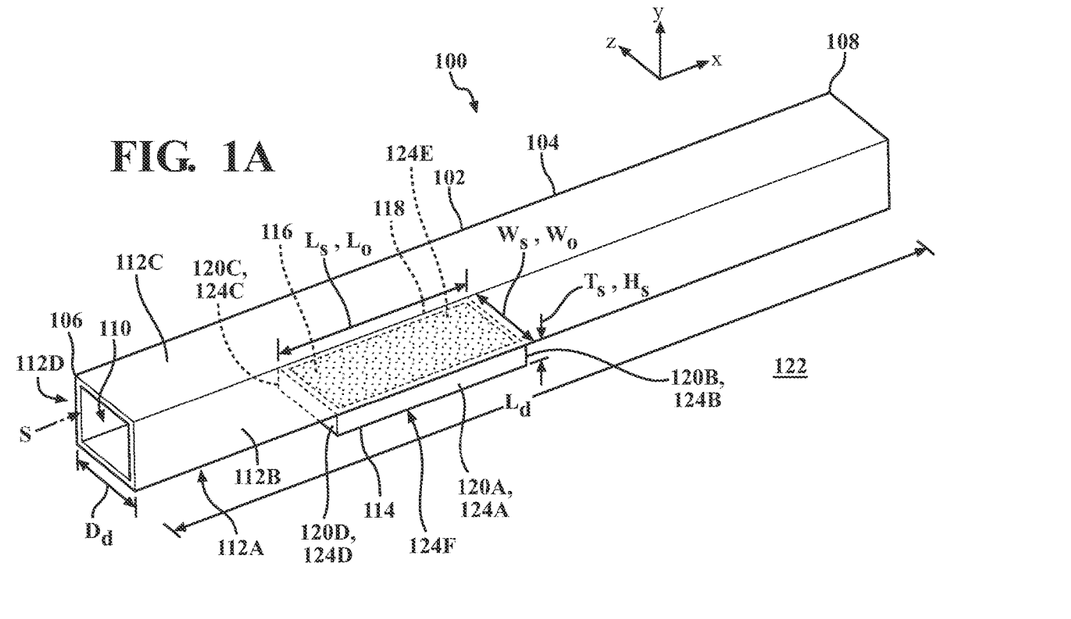
FIG. 1A shows a duct having a noise attenuator.
Figure 1B:
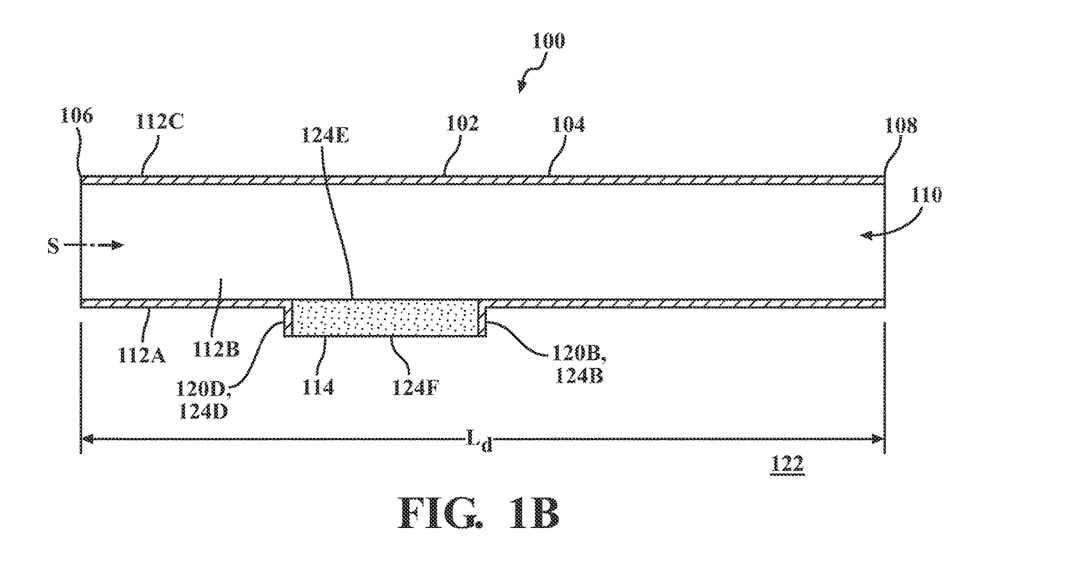
FIG. 1B is a side cross-sectional view of the duct in FIG. 1A.
Figure 7:
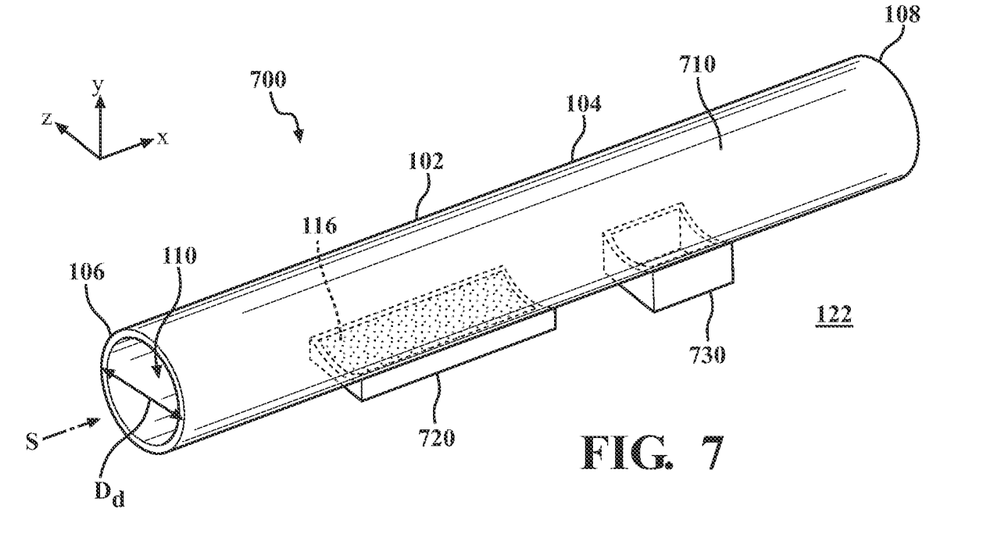
FIG. 7 shows a duct having a circular cross-section, a noise attenuator, and an acoustic resonator.

Referring to FIGS. 1A and 1B, a sound-mitigating device 100 for a duct system according to one form of the present disclosure is shown. FIG. 1A shows an example of a duct 102, and FIG. 1B shows a side cross-sectional view of the duct 102 along the x-axis. The duct 102 may be any kind of duct and may be configured for directing the flow of air or any other type of gas. In some instances, the duct 102 can be a component of a heating, ventilating, and air conditioning (HVAC) system, as described in further detail below in connection with FIG. 9. In other instances, the duct 102 can be a muffler for a vehicle that is used to reduce the sound created by the vehicle's engine. Regardless of the application, the sound-mitigating device 100 may be configured to mitigate noise propagation created by gas flowing through the duct 102. In the alternative, or in addition to, the sound-mitigating device 100 may be configured to mitigate noise propagation not created by gas flowing through the duct 102. For example, the duct 102 can absorb and/or reflect sound waves S traveling through the duct 102 in order to mitigate noise propagation within the duct 102. The duct 102 and its components, described in further detail below, can be formed in any suitable manner. For example, the duct 102 can be unitarily formed as a single piece by 3D printing, injection molding, polymer casting, rotational molding, vacuum forming, blow molding, extrusion, and/or any other suitable method. In other instances, the duct 102 can be formed from multiple components connected together. The components can be made using the aforementioned methods and can be connected together by adhering, welding, and/or any other suitable method. The duct 102 can be formed from any suitable material, for example, from metal, plastic, etc. The duct 102 can have a cross-section having substantially the shape of a square (as shown in FIGS. 1A-6B), a rectangle, a pentagon, a hexagon, an oval, or a circle (as shown in FIG. 7), among others.

The duct 102 includes a duct body 104, which may form an elongated, tube-like component of the duct 102 and may define an inlet 106, an outlet 108, and a channel 110 fluidically connecting the inlet 106 and the outlet 108. Within the channel 110, air or other types of gas may flow through the duct body 104 from the inlet 106 to the outlet 108. Likewise, sound waves S may travel through the duct body 104 from the inlet 106 to the outlet 108. Accordingly, the inlet 106 is located upstream of the outlet 108. The duct body 104 can define an inner dimension $D_d$ and a length $L_d$. In arrangements in which the duct body 104 has a rectangular- or square-shaped cross-section, the duct body 104 may have one or more sides 112. For example, the duct body 104 of FIGS. 1A-6B has a first side 112A, a second side 112B, a third side 112C, and a fourth side 112D.

In some variations, the duct 102 includes a noise attenuator 114. The noise attenuator 114 may be configured to mitigate noise propagation within the channel 110. For example, the noise attenuator 114 may be configured to absorb the sound waves S traveling within the channel 110. The noise attenuator 114 is located on the duct 102 external to the channel 110 and includes sound-absorbing material 116 (e.g., a lossy material). The sound-absorbing material 116 can be any suitable sound-absorbing material. For example, the sound-absorbing material 116 can be a porous, foam-like material such as polyurethane foam or melamine foam, or the sound-absorbing material 116 can be a metallic, porous foam-like such as metallic foam.

The duct body 104 may include an opening 118, and the noise attenuator 114 may be located about the opening 118. For example, as shown, the noise attenuator 114 covers the entire opening 118. Sound waves traveling through the opening 118 may be absorbed by the sound-absorbing material 116, thus mitigating noise propagation within the channel 110. The opening 118 may be located on one of the sides 112 of the duct body 104. For example, as shown, the opening 118 is located on the first side 112A. The opening 118 can be any suitable shape. For example, as shown, the opening 118 is substantially rectangular in shape. In arrangements in which the opening 118 is substantially rectangular, the opening 118 can define a width $W_o$ and a length $L_o$. As shown, the width $W_o$ of the opening is slightly smaller than the inner dimension of the duct body 104. For example, the width $W_o$ of the opening can be about 70% of the inner dimension $D_d$ of the duct body 104, about 80% of the inner dimension $D_d$ of the duct body 104, or about 90% of the inner dimension $D_d$ of the duct body 104; however, the width $W_o$ of the opening 118 can have any suitable dimension. As shown, the length $L_o$ of the opening 118 is about 25% of the length $L_d$ of the duct body 104; however, the length $L_o$ of the opening 118 can have any suitable dimension.

The sound-absorbing material 116 also defines a width $W_s$ and a length $L_s$. In one or more arrangements, the width $W_s$ of the sound-absorbing material 116 is substantially equal to or greater than the width $W_o$ of the opening 118. Likewise, in one or more arrangements, the length $L_s$ of the sound-absorbing material 116 is substantially equal to or greater than the length $L_o$ of the opening 118. The sound-absorbing material 116 can be attached to the duct body 104 about the opening 118 in any suitable manner. For example, in one or more arrangements, the width $W_s$ and the length $L_s$ of the sound-absorbing material 116 may be respectively greater than the width $W_o$ and the length $L_o$ of the opening 118 such that the sound-absorbing material 116 can be adhered to the duct body 104 about the opening 118 (e.g., via press-fit). The sound-absorbing material 116 is adhered to the duct body 104, for example, by glue.

In one or more other arrangements, as shown, the sound-absorbing material 116 can be attached to the duct body 104 using one or more sidewalls 120 of the duct 102. Referring again to FIG. 1A, about the opening 118, the duct 102 can include one or more sidewalls 120. For example, as shown, the duct 102 includes four sidewalls 120 including a first sidewall 120A, a second sidewall 120B, a third sidewall 120C, and a fourth sidewall 120D. The sidewall(s) 120 extend from the duct body 104 in a direction toward an external environment 122 of the duct 102. The sidewall(s) 120 can be configured to house the sound-absorbing material 116. Accordingly, in this arrangement, the width $W_s$ and the length $L_s$ of the sound-absorbing material 116 are substantially equal to the width $W_o$ and length $L_o$ of the opening 118. As described above, the sidewall(s) 120 can be formed unitarily with the duct body 104, or the sidewall(s) 120 can be formed as separate components from the duct body 104 that are configured for attachment to the duct body 104. The sidewall(s) 120 can define a height Hs, and in one or more arrangements, the height of the sidewall(s) 120 corresponds to a thickness $T_s$ of the sound-absorbing material 116. However, it should be understood that the sound-absorbing material 116 can have a thickness $T_s$ greater than or less than the height Hs of the sidewall(s) 120. Moreover, while the duct 102 is described herein as having four sidewalls 120, it should be understood that the duct 102 can include a single sidewall 120 around the sound-absorbing material 116, or the duct 102 can include any suitable number of sidewalls 120.

As shown, the sound-absorbing material 116 can be generally shaped as a cuboid having 6 faces 124. For example, the sound-absorbing material 116 can have a first side face 124A, a second side face 124B, a third side face 124C, and a fourth side face 124D. The side faces 124A-124D correspond to the four sidewalls 120. The faces 124 also include an inner face 124E and an outer face 124F. As shown, the inner face 124E faces toward the channel 110, and the outer face 124F faces toward the external environment 122. In one or more arrangements, as shown, the outer face 124F is in direct contact with the external environment 122. For example, there is no sidewall 120 between the outer face 124F and the external environment 122. When the outer face 124F is in direct contact with the external environment 122, noise attenuation is significantly improved compared to arrangements in which there is sidewall 120 between the outer face 124F and the external environment 122.

Figure 2A:
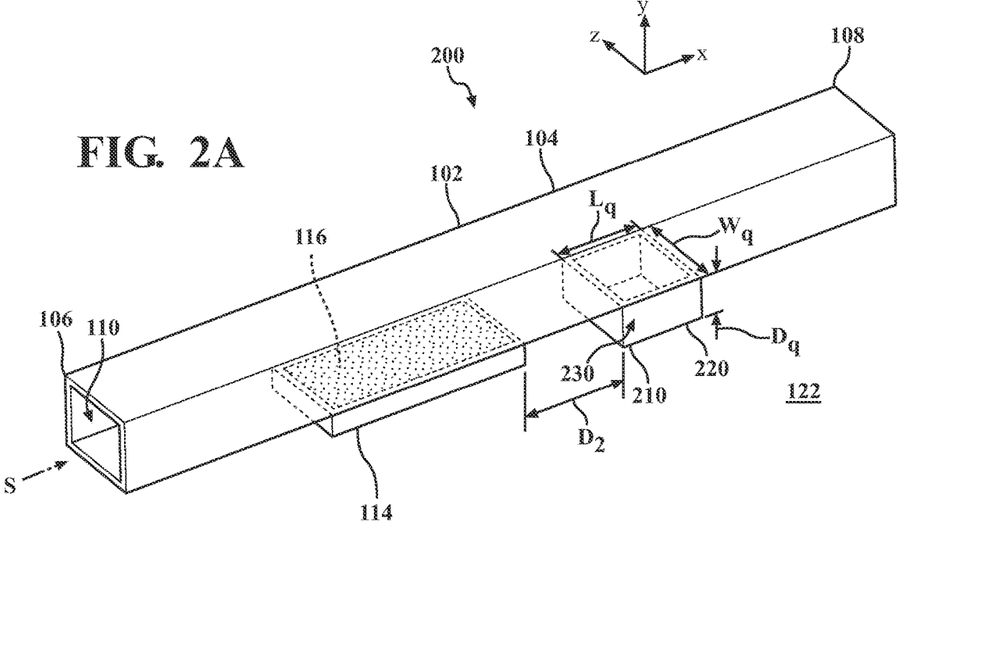
FIG. 2A shows a duct having a noise attenuator and a downstream acoustic resonator, where the downstream acoustic resonator is a quarter-wavelength resonator.
Figure 2B:
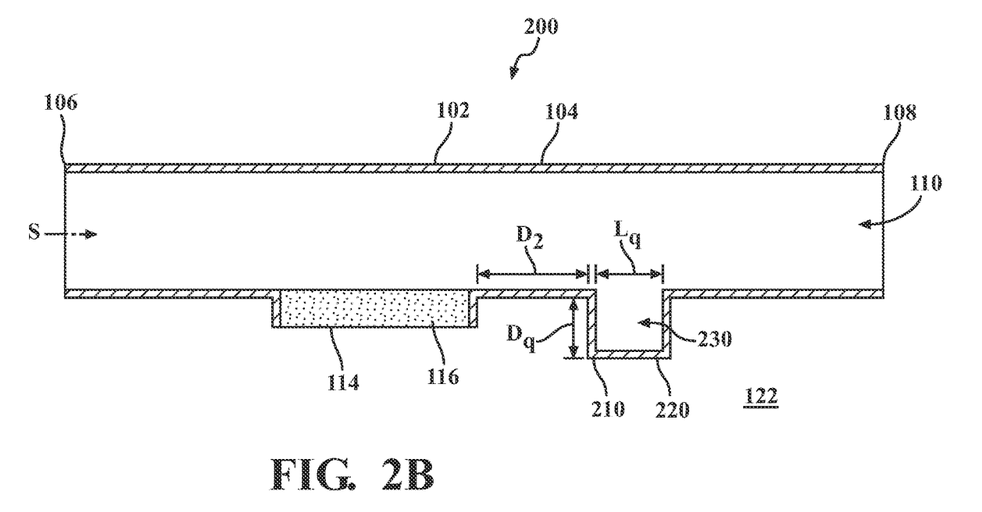
FIG. 2B shows a side cross-sectional view of the duct of FIG. 2A.

Referring now to FIGS. 2A and 2B, a sound-mitigating device 200 for a duct system according to another form of the present disclosure is shown. FIG. 2A shows the duct 102 of the sound-mitigating device 200 as described above, and FIG. 2B shows a side cross-sectional view of the duct 102 along the x-axis. In addition to the previously-described duct components and noise attenuator 114, the duct 102 can include an acoustic resonator 210, which may further mitigate noise propagated in the channel 110. The acoustic resonator 210 is located downstream of the noise attenuator 114. As used herein, "downstream" refers to the direction of sound waves traveling through the duct. For example, as described in further detail below in connection with FIG. 9, in some instances, while air or other gas travels in one direction through the duct, sound waves may travel in the same direction or the substantially opposite direction. Accordingly, the acoustic resonator is located downstream of the noise attenuator with respect to the direction of the sound waves. Accordingly, the acoustic resonator 210 is separated from the noise attenuator 114 by a distance $D_2$. The acoustic resonator 210 can be formed unitarily with the duct body 104, or the acoustic resonator 210 can be formed as a separate component from the duct body 104 that is configured for attachment to the duct body 104. The acoustic resonator 210 can be formed from the same material as the duct body 104, or the acoustic resonator 210 can be formed from a different material than the duct body 104.

In one or more arrangements, the acoustic resonator 210 is a quarter-wavelength resonator 220. The quarter-wavelength resonator 220 is configured to reflect sound waves S to mitigate noise propagation within the channel 110. The quarter-wavelength resonator 220 includes a quarter-wavelength resonator cavity 230 in fluidic communication with the channel 110. The quarter-wavelength resonator cavity 230 defines a depth $D_q$, a width $W_q$, and a length $L_q$. The depth $D_q$, the width $W_q$, and/or the length $L_q$ can be any suitable dimension. In some instances, the width $W_q$ can be about 70% of the inner dimension $D_d$ of the duct body 104, about 80% of the inner dimension $D_d$ of the duct body 104, or about 90% of the inner dimension $D_d$ of the duct body 104; however, the width $W_q$ can be any suitable dimension. In some instances, the width $W_q$ is substantially equal to the width of the noise attenuator 114. The width $W_q$ determines the bandwidth of the spectrum reflected by the quarter-wavelength resonator 220. The depth $D_q$ determines the resonance frequency of the quarter-wavelength resonator 220. More specifically, a lesser depth $D_q$ corresponds to a higher resonance frequency of the quarter-wavelength resonator 220, and a greater depth $D_q$ corresponds to a lower resonance frequency of the quarter-wavelength resonator 220.

The quarter-wavelength resonator 220 defines a resonance frequency $f_q$, which is defined by the following equation (Equation 1), where c is the speed of the sound traveling through the duct and a is a correction factor between about 0.2 and about 0.9:

$$f_q = \frac{c}{4(D_q + \alpha W_q)} \quad (1)$$

It may be advantageous to adjust the depth $D_q$ and the width $W_q$ of the quarter-wavelength resonator 220 such that the resonance frequency $f_q$ of the quarter-wavelength resonator 220 is substantially equal to a resonance frequency of the sound waves S traveling through the channel 110. Doing so may have an improved effect on noise mitigation within the channel 110.

Figure 3A:
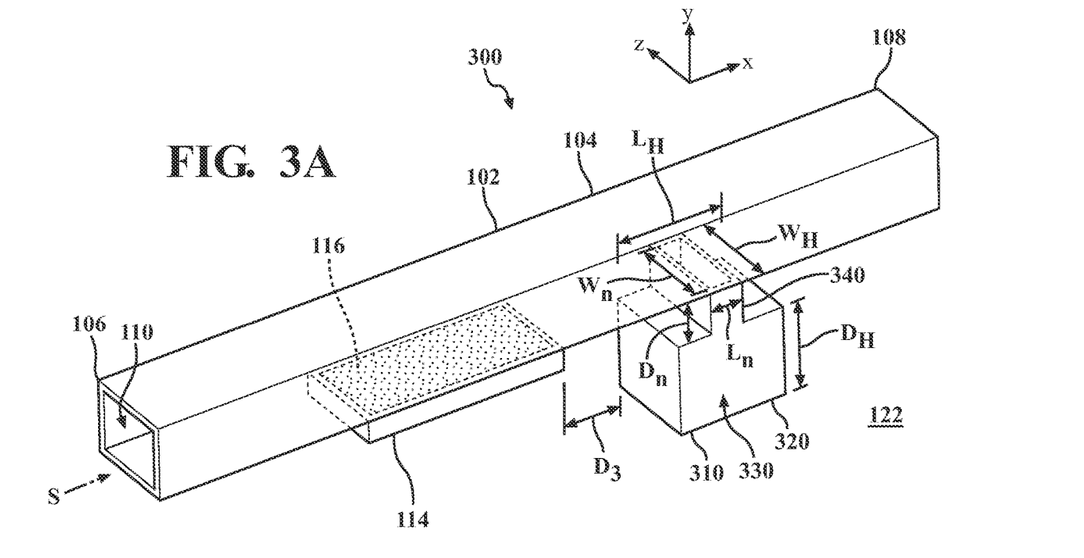
FIG. 3A shows a duct having a noise attenuator and a downstream acoustic resonator, where the downstream acoustic resonator is a Helmholtz resonator.
Figure 3B:
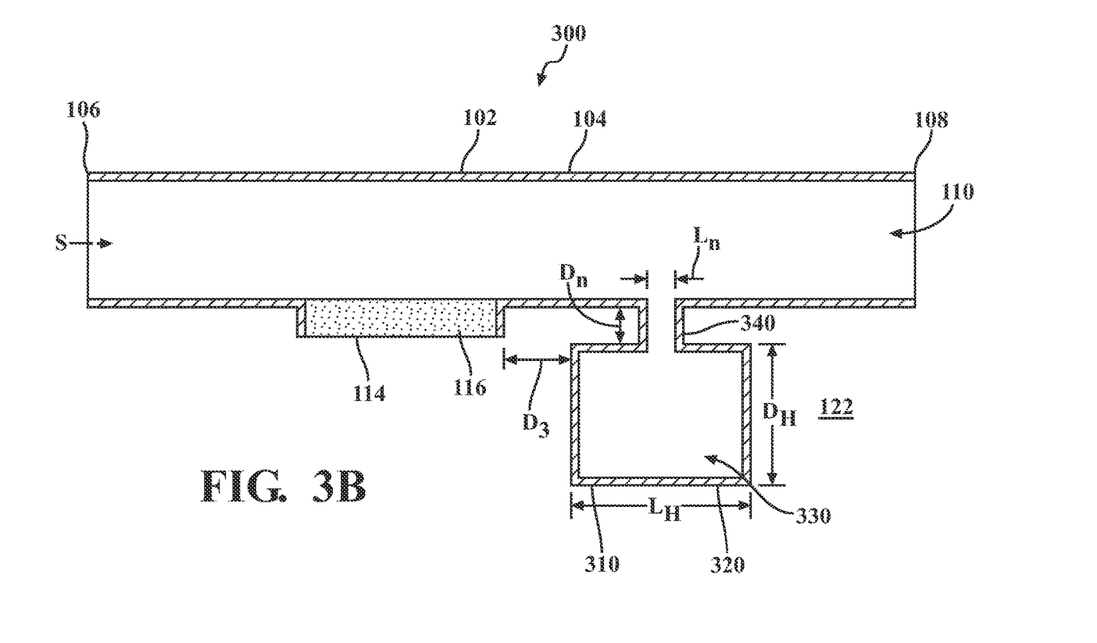
FIG. 3B shows a side cross-sectional view of the duct of FIG. 3A.

Referring now to FIGS. 3A and 3B, a sound-mitigating device 300 for a duct system according to another form of the present disclosure is shown. FIG. 3A shows the duct 102 of the sound-mitigating device 300 as described above, and FIG. 3B shows a side cross-sectional view of the duct 102 along the x-axis. In addition to the previously-described duct components and noise attenuator 114, the duct 102 can include an acoustic resonator 310, which may further mitigate noise propagated in the channel 110. The acoustic resonator 310 is located downstream of the noise attenuator 114 (e.g., the acoustic resonator 310 is closer to the outlet 108 than the noise attenuator 114 is). Accordingly, the acoustic resonator 310 is separated from the noise attenuator 114 by a distance $D_3$. The acoustic resonator 310 can be formed unitarily with the duct body 104, or the acoustic resonator 310 can be formed as a separate component from the duct body 104 that is configured for attachment to the duct body 104. The acoustic resonator 310 can be formed from the same material as the duct body 104, or the acoustic resonator 310 can be formed from a different material than the duct body 104.

In one or more arrangements, the acoustic resonator 310 is a Helmholtz resonator 320. The Helmholtz resonator 320 is configured to reflect sound waves S to mitigate noise propagation within the channel 110. The Helmholtz resonator 320 includes a Helmholtz resonator cavity 330 and a neck 340 connecting the Helmholtz resonator cavity 330 to the duct body 104. The Helmholtz resonator cavity 330 is in fluidic communication with the channel 110 through the neck 340. The Helmholtz resonator cavity 330 defines a $D_H$, a width $W_H$, and a length $L_H$. The depth $D_H$, the width $W_H$, and/or the length $L_H$ can be any suitable dimension. In some instances, the width $W_H$ can be about 70% of the inner dimension $D_d$ of the duct body 104, about 80% of the inner dimension $D_d$ of the duct body 104, or about 90% of the inner dimension $D_d$ of the duct body 104; however, the width $W_H$ can be any suitable dimension. In some instances, the width $W_H$ is substantially equal to the width of the noise attenuator 114. The width $W_H$ determines the bandwidth of the spectrum reflected by the Helmholtz resonator 320. The depth $D_H$ determines the resonance frequency of the Helmholtz resonator 320. More specifically, a lesser depth $D_H$ corresponds to a higher resonance frequency of the Helmholtz resonator 320, and a greater depth $D_H$ corresponds to a lower resonance frequency of the Helmholtz resonator 320. The Helmholtz resonator cavity 330 also defines a volume VH, which is the product of the depth $D_H$, the width $W_H$, and the length $L_H$ of the Helmholtz resonator cavity 330.

The neck 340 defines a length $L_n$, a width $W_n$, and a depth $D_n$. The neck 340 defines a cross-sectional area $A_n$, which is a product of the length $L_n$ and the width $W_n$. The Helmholtz resonator 320 defines a resonance frequency $f_H$, which is defined by the following equations (Equations 2 and 3), where v is the speed of sound in a gas, y is the adiabatic index of the gas (e.g., 1.4 for air), Po is the static pressure in the Helmholtz resonator cavity 330, and p is the mass density of the gas:

$$v = \sqrt{\gamma \frac{P_0}{\rho}} \quad (3)$$

$$f_H = \frac{v}{2\pi}\sqrt{\frac{A_n}{V_H D_n}} \quad (2)$$

It may be advantageous to adjust the dimensions of the Helmholtz resonator 320 (e.g., the $D_H$, the width $W_H$, and/or the length $L_H$ Helmholtz resonator cavity 330 and/or the length $L_n$ and the width $W_n$ of the neck 340) such that the resonance frequency $f_H$ of the Helmholtz resonator 320 is substantially equal to a resonance frequency of the sound waves S traveling through the channel 110. Doing so may have an improved effect on noise mitigation within the channel 110.

In either of the variations described in connection with FIGS. 2A-3B (whether the acoustic resonator 210, 310 is a quarter-wavelength resonator 220 or a Helmholtz resonator 320), in some instances, the noise attenuator 114 and the acoustic resonator 210, 310 work together to create resonance coupling for mitigating sound within the duct 102. More specifically, though the noise attenuator 114 may be non-resonant, the sound absorption of the noise attenuator 114 may couple with the acoustic resonance of the acoustic resonator 210, 310 when the acoustic resonator 210, 310 resonates. The resonance coupling is a function of the resonance frequency of the acoustic resonator 210, 310 and the distance $D_2$ or $D_3$ between the noise attenuator 114 and the acoustic resonator 210, 310.

Figure 4A:
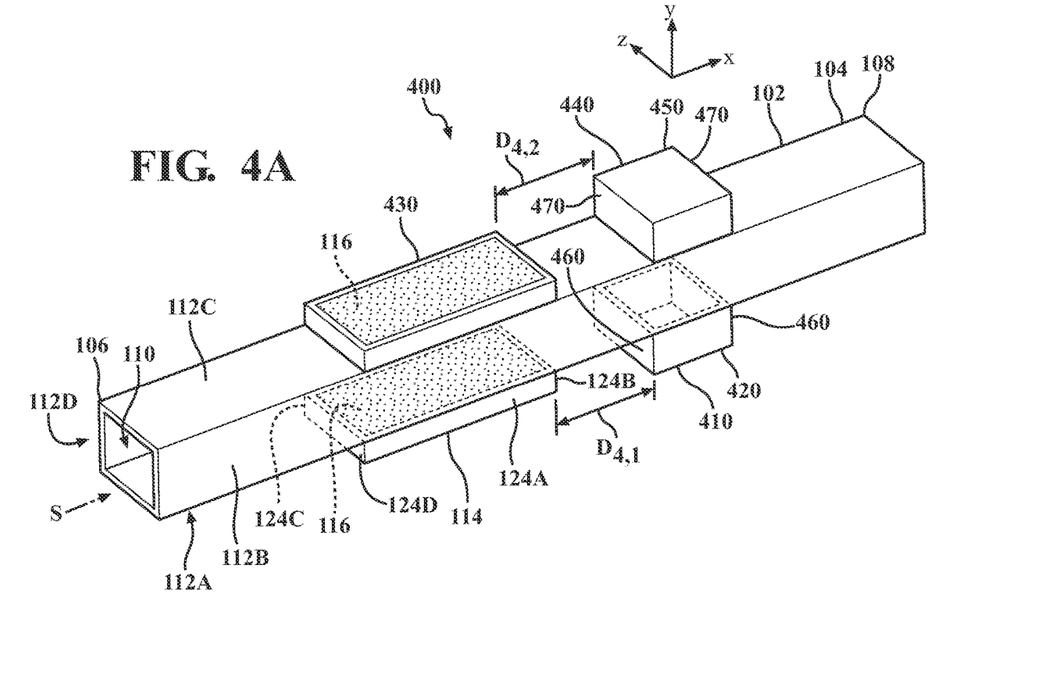
FIG. 4A shows a duct having a first noise attenuator, a first downstream acoustic resonator, a second noise attenuator, and a second downstream acoustic resonator.
Figure 4B:
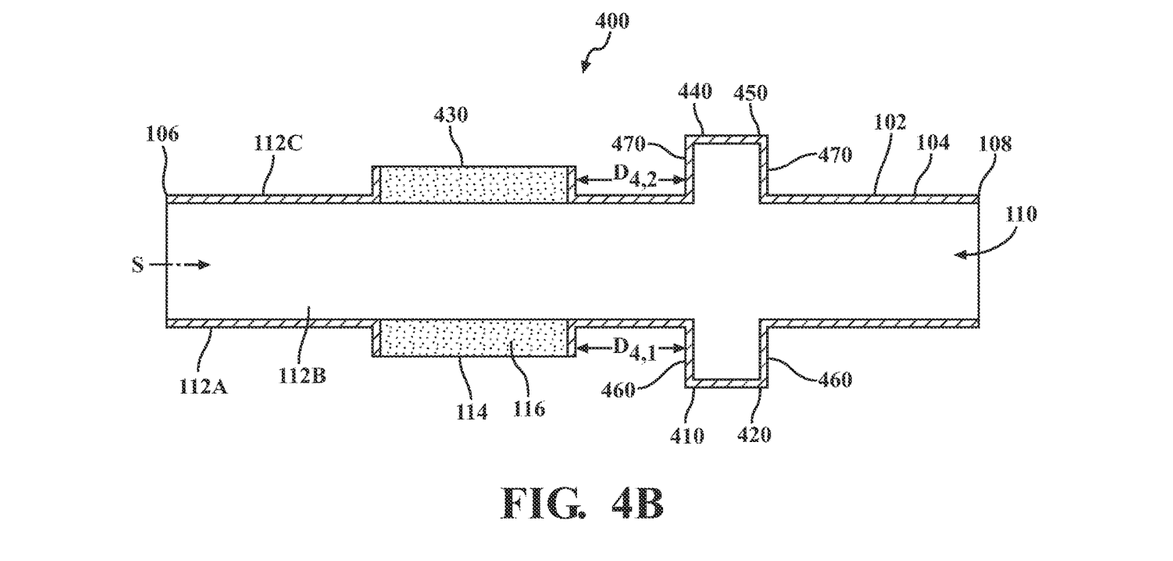
FIG. 4B shows a side cross-sectional view of the duct of FIG. 4A.

Referring now to FIGS. 4A and 4B, a sound-mitigating device 400 for a duct system according to another form of the present disclosure is shown. FIG. 4A shows the duct 102 of the sound-mitigating device 200 as described above, and FIG. 4B shows a side cross-sectional view of the duct 102 along the x-axis. In addition to the previously-described duct components, the duct 102 includes a noise attenuator 114, as described above. The noise attenuator 114 is a first noise attenuator 114. The duct 102 also includes a first acoustic resonator 410. As shown, the first acoustic resonator 410 is a first quarter-wavelength resonator 420. The first quarter-wavelength resonator 420 can be the quarter-wavelength resonator 220 described above in connection with FIGS. 2A and 2B. However, it will be appreciated that the first acoustic resonator 410 can be a first Helmholtz resonator, and the first Helmholtz resonator can be the Helmholtz resonator 320 described above in connection with FIGS. 3A and 3B. In either case, the first acoustic resonator 410 is located downstream of the first noise attenuator 114. The first acoustic resonator 410 is located at a first distance $D_{4,1}$ from the first noise attenuator 114.

The duct 102 can also include a second noise attenuator 430 and a second acoustic resonator 440. In addition to the first noise attenuator 114 and the first acoustic resonator 410, the use of the second noise attenuator 430 and the second acoustic resonator 440 in connection with the duct 102 may have the effect of increased sound mitigation within the channel 110. Each of the second noise attenuator 430 and the second acoustic resonator 440 will be described in turn in further detail below.

As shown, like the first noise attenuator 114, the second noise attenuator 430 can be the noise attenuator 114 described above in connection with FIGS. 1A-3B. The second noise attenuator 430 is located on one of the other sides 112 of the duct 102 from the first noise attenuator 114. For example, as shown, the first noise attenuator 114 is located on the first side 112A, and the second noise attenuator 430 is located on the third side 112C. However, it should be appreciated that the first noise attenuator 114 can be located on the first side 112A, and the second noise attenuator 430 can be located on the second side 112B or the fourth side 112D. Moreover, the first noise attenuator 114 does not have to be located on the first side 112A. Indeed, the first noise attenuator 114 can be located on any side 112 and the second noise attenuator 430 can be located on one of any of the other sides 112. The second noise attenuator 430 can be positioned with respect to the first noise attenuator 114 in any suitable manner. For example, as shown, the second noise attenuator 430 is located above the first noise attenuator 114. More specifically, the second noise attenuator 430 is located directly above the first noise attenuator 114 such that each of the side faces 124A, 124B, 124C, and 124D of the first noise attenuator 114 are substantially co-planar with each of the respective side faces of the second noise attenuator 430. However, it should be appreciated that the second noise attenuator 430 may be located above the first noise attenuator 114 in a manner such that the second noise attenuator 430 is off set from the first noise attenuator 114.

As mentioned above, the duct 102 can also include a second acoustic resonator 440. As shown, like the first acoustic resonator 410, the second acoustic resonator 440 can be a second quarter-wavelength resonator 450. The second quarter-wavelength resonator 450 can be the quarter-wavelength resonator 220 described above in connection with FIGS. 2A and 2B. However, it will be appreciated that the second acoustic resonator 440 can be a second Helmholtz resonator, and the second Helmholtz resonator can be the Helmholtz resonator 320 described above in connection with FIGS. 3A and 3B. The second acoustic resonator 440 is located on one of the other sides 112 of the duct 102 from the first acoustic resonator 410. For example, as shown, the first acoustic resonator 410 is located on the first side 112A, and the second acoustic resonator 440 is located on the third side 112C. However, it should be appreciated that the first acoustic resonator 410 can be located on the first side 112A, and the second acoustic resonator 440 can be located on the second side 112B or the fourth side 112D. Moreover, the first acoustic resonator 410 does not have to be located on the first side 112A. Indeed, the first acoustic resonator 410 can be located on any side 112 and the second acoustic resonator 440 can be located on one of any of the other sides 112. The second acoustic resonator 440 can be positioned with respect to the first acoustic resonator 410 in any suitable manner. For example, as shown, the second acoustic resonator 440 is located above the first acoustic resonator 410. More specifically, the second acoustic resonator 440 is located directly above the first acoustic resonator 410 such the side faces 460 of the first acoustic resonator 410 are substantially co-planar with the side faces 470 of the second acoustic resonator 440. However, it should be appreciated that the second acoustic resonator 440 may be located above the first acoustic resonator 410 in a manner such that the second acoustic resonator is off set from the first acoustic resonator 410.

As shown, the second acoustic resonator 440 is located on the same side 112 as the second noise attenuator 430. Accordingly, the second acoustic resonator 440 is located at a second distance $D_{4,2}$ from the second noise attenuator 430. The second distance $D_{4,2}$, as shown, is substantially equal to the first distance $D_{4,1}$. However, it will be understood that the second distance $D_{4,2}$ may be different from the first distance $D_{4,1}$. Moreover, it will be understood that the second acoustic resonator 440 does not have to be located on the same side 112 as the second noise attenuator 430.

As described above, the use of the first noise attenuator 114, the first acoustic resonator 410, the second noise attenuator 430, and the second acoustic resonator 440 may have a combined, synergistic effect on noise mitigation within the channel 110. The combined sound absorption may depend on the first distance $D_{4,1}$, the second distance $D_{4,2}$, and/or the locations and/or dimensions of each of the first noise attenuator 114, the first acoustic resonator 410, the second noise attenuator 430, and the second acoustic resonator 440. These parameters may be adjusted based on the frequency of the sound waves S traveling through the channel 110.

Figure 5A:
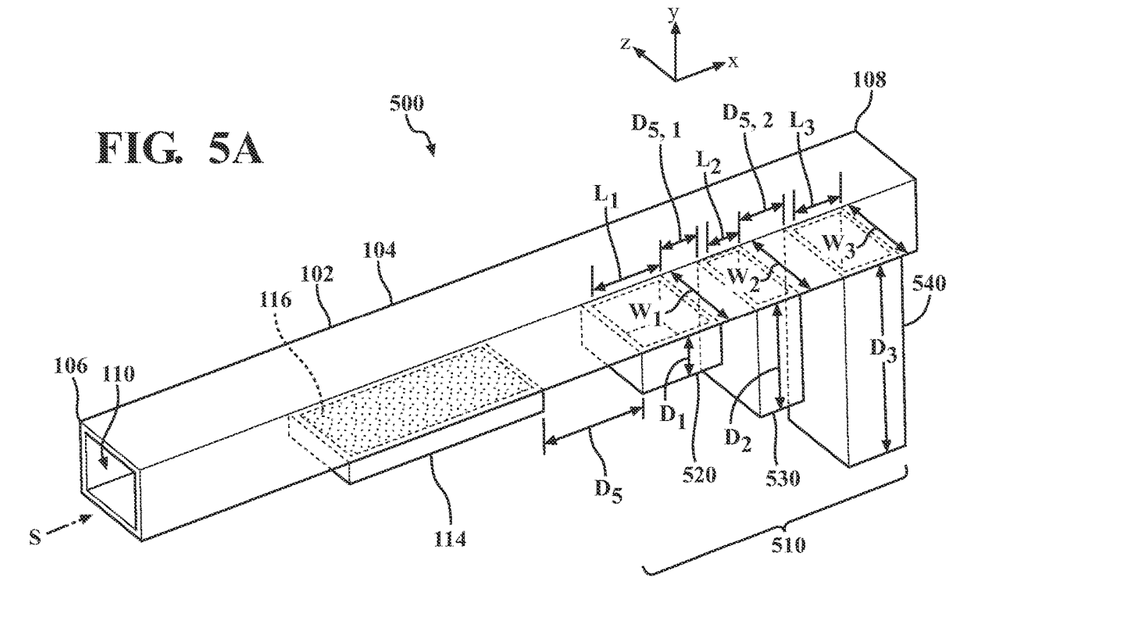
FIG. 5A shows a duct having a noise attenuator and a plurality of downstream acoustic resonators.
Figure 5B:
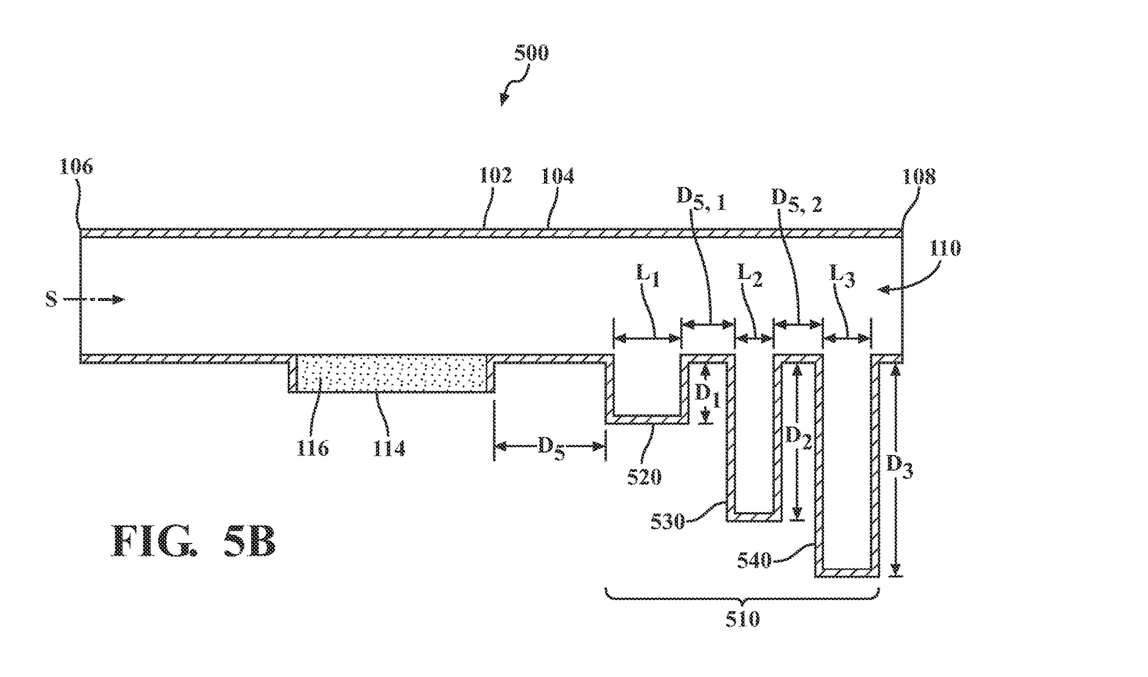
FIG. 5B shows a side cross-sectional view of the duct of FIG. 5A.

Referring now to FIGS. 5A and 5B, a sound-mitigating device 500 for a duct system according to another form of the present disclosure is shown. FIG. 5A shows the duct 102 of the sound-mitigating device 200 as described above, and FIG. 5B shows a side cross-sectional view of the duct 102 along the x-axis. In addition to the previously-described duct components and noise attenuator 114, the duct 102 can include a plurality of acoustic resonators 510. The plurality of acoustic resonators 510 can include any suitable number of acoustic resonators. For example, as shown, the plurality of acoustic resonators 510 can include three acoustic resonators: a first acoustic resonator 520, a second acoustic resonator 530, and a third acoustic resonator 540. However, the plurality of acoustic resonators 510 can include two acoustic resonators, four acoustic resonators, five acoustic resonators, etc., or any other suitable number of acoustic resonators. The plurality of acoustic resonators 510 can be located downstream of the noise attenuator 114. The plurality of acoustic resonators 510 can be located at a distance $D_5$ from the noise attenuator 114.

As shown, each of the plurality of acoustic resonators 510 is a quarter-wavelength resonator, similar to the quarter-wavelength resonator 220 described in connection with FIGS. 2A and 2B. However, it will be understood that each of the plurality of acoustic resonators 510 can be a Helmholtz resonator, similar to the Helmholtz resonator 320 described in connection with FIGS. 3A and 3B. Moreover, the plurality of acoustic resonators 510 can include both quarter-wavelength resonators and Helmholtz resonators in any suitable combination. For example, the first acoustic resonator 520 can be a quarter-wavelength resonator, the second acoustic resonator 530 can be a Helmholtz resonator, and the third acoustic resonator 540 can be a quarter-wavelength resonator.

Each of the plurality of acoustic resonators 510 may be separated by a distance. More specifically, the first acoustic resonator 520 and the second acoustic resonator 530 may be separated by a first distance $D_{5,1}$. Similarly, the second acoustic resonator 530 and the third acoustic resonator 540 may be separated by a second distance $D_{5,2}$. The first distance $D_{5,1}$ and the second distance $D_{5,2}$ may be substantially equal, as shown, or the first distance $D_{5,1}$ may be different from the second distance $D_{5,2}$. Additionally, each of the plurality of acoustic resonators 510 defines a length, a width, and a depth. The first acoustic resonator 520 defines a length $L_1$, a width $W_1$, and a depth $D_1$. The second acoustic resonator 530 defines a length $L_2$, a width $W_2$, and a depth $D_2$. The third acoustic resonator 540 defines a length $L_3$, a width $W_3$, and a depth $D_3$. The lengths $L_1$, $L_2$, and $L_3$ can be substantially equal to each other, or one or more of the lengths $L_1$, $L_2$, and $L_3$ can be different from the others. For example, the length $L_1$ is substantially equal to the length $L_3$, while the length $L_2$ is less than the lengths $L_1$ and $L_3$. The widths $W_1$, $W_2$, and $W_3$ can be substantially equal to each other, or one or more of the widths $W_1$, $W_2$, and $W_3$ can be different from the others. As shown, the widths $W_1$, $W_2$, and $W_3$ are substantially equal. The depths $D_1$, $D_2$, and $D_3$ can be substantially equal to each other, or one or more of the depths $D_1$, $D_2$, and $D_3$ can be different from the others. As shown, the depth $D_3$ is greater than the depth $D_2$, and the depth $D_2$ is greater than the depth $D_1$. Each of the plurality of acoustic resonators 510 defines a resonance frequency, which may be calculated based on Equation 1 described above.

Together, each of the plurality of acoustic resonators 510 can create the effect of resonance coupling, which may have an improved effect on sound mitigation within the channel 110. The resonance coupling of the plurality of acoustic resonators 510 may depend on the dimensions of each of the first acoustic resonator 520, the second acoustic resonator 530, and the third acoustic resonator 540, as well as the distances $D_{5,1}$ and $D_{5,2}$. Moreover, the plurality of acoustic resonators 510, in combination with the noise attenuator 114, may create resonance coupling to further improve sound mitigation within the channel 110. Resonance coupling between the plurality of acoustic resonators 510 and the noise attenuator 114 may depend on the resonance frequency of the noise attenuator 114, the individual resonance frequencies of each of the plurality of acoustic resonators 510, and the distance $D_5$ between the noise attenuator 114 and the plurality of acoustic resonators 510.

Figure 6A:
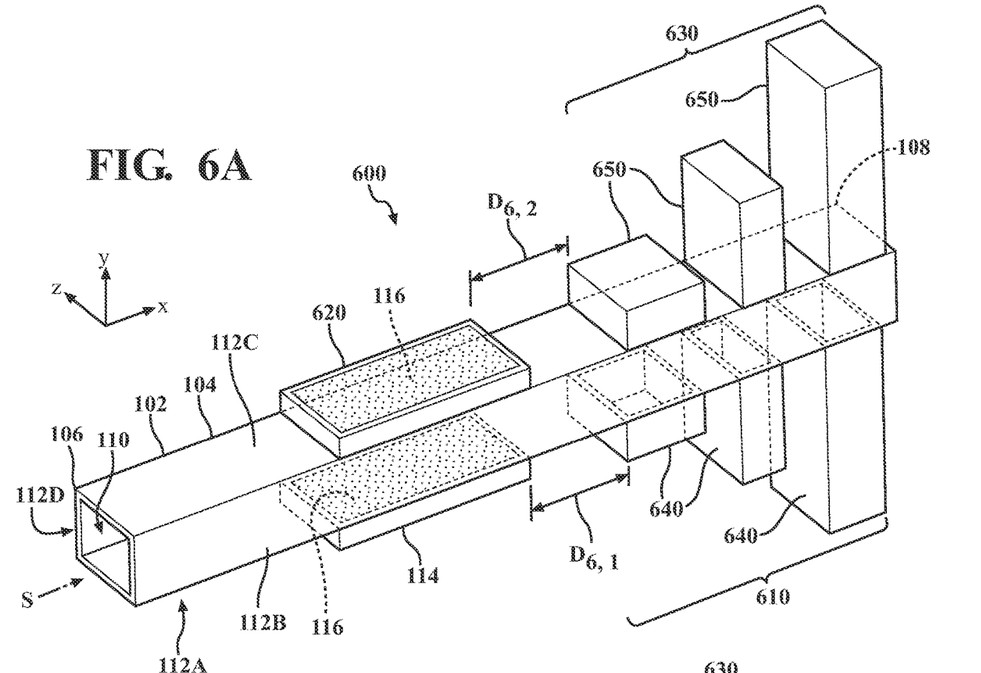
FIG. 6A shows a duct having a first noise attenuator, a first plurality of downstream acoustic resonators, a second noise attenuator, and a second plurality of downstream acoustic resonators.
Figure 6B:
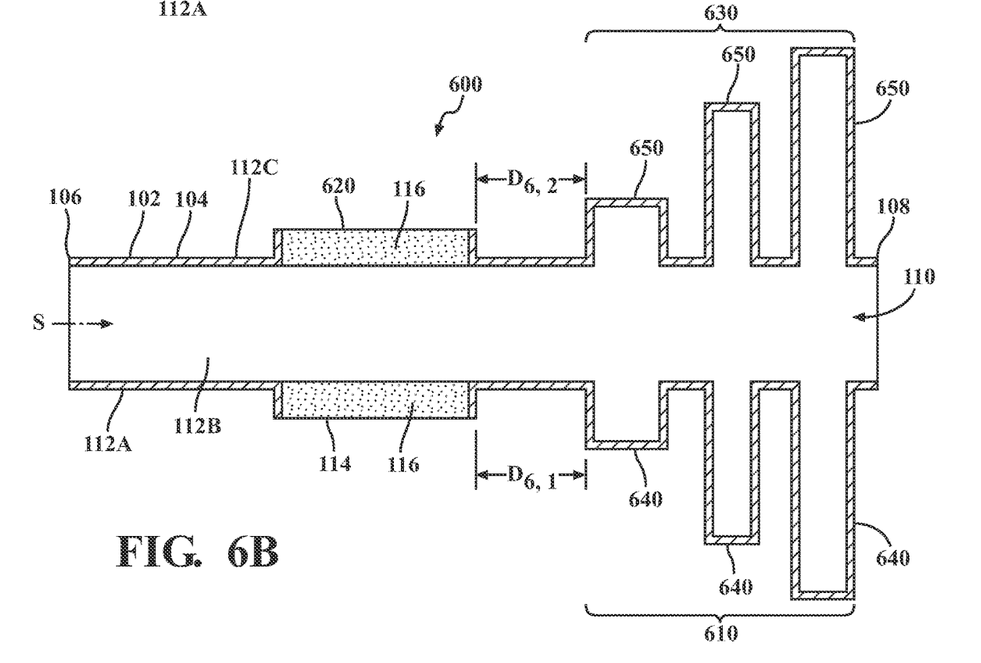
FIG. 6B shows a side cross-sectional view of the duct of FIG. 6A.

Referring now to FIGS. 6A and 6B, a sound-mitigating device 600 for a duct system according to another form of the present disclosure is shown. FIG. 6A shows the duct 102 of the sound-mitigating device 200 as described above, and FIG. 6B shows a side cross-sectional view of the duct 102 along the x-axis. In addition to the previously-described duct components, the duct 102 includes a noise attenuator 114, as described above. The noise attenuator 114 is a first noise attenuator 114. The duct also includes a first plurality of acoustic resonators 610. The first plurality of acoustic resonators 610 can have the same characteristics as the plurality of acoustic resonators 510 described in connection with FIGS. 5A and 5B, or the first plurality of acoustic resonators 610 can have any other suitable characteristics. The first plurality of acoustic resonators 610 can be located at a first distance $D_{6,1}$ from the first noise attenuator 114.

The duct 102 also includes a second noise attenuator 620 and a second plurality of acoustic resonators 630. In addition to the first noise attenuator 114 and the first plurality of acoustic resonators 610, the use of the second noise attenuator 620 and the second plurality of acoustic resonators 630 in connection with the duct 102 may have the effect of increased sound mitigation within the channel 110. Each of the second noise attenuator 620 and the second plurality of acoustic resonators 630 will be described in turn in further detail below.

As shown, like the first noise attenuator 114, the second noise attenuator 620 can be the noise attenuator 114 described above in connection with FIGS. 1A-3B. The second noise attenuator 630 is located on one of the other sides 112 of the duct 102 from the first noise attenuator 114. For example, as shown, the first noise attenuator 114 is located on the first side 112A, and the second noise attenuator 620 is located on the third side 112C. However, it should be appreciated that the first noise attenuator 114 can be located on the first side 112A, and the second noise attenuator 620 can be located on the second side 112B or the fourth side 112D. Moreover, the first noise attenuator 114 does not have to be located on the first side 112A. Indeed, the first noise attenuator 114 can be located on any side 112 and the second noise attenuator 620 can be located on one of any of the other sides 112. The second noise attenuator 620 can be positioned with respect to the first noise attenuator 114 in any suitable manner. For example, as shown, the second noise attenuator 620 is located above the first noise attenuator 114. More specifically, the second noise attenuator 620 is located directly above the first noise attenuator 114 such that each of the side faces 124A, 124B, 124C, and 124D of the first noise attenuator 114 are substantially co-planar with each of the side faces of the second noise attenuator 620. However, it should be appreciated that the second noise attenuator 620 may be with respect to the first noise attenuator in a manner such that the second noise attenuator 620 is off set from the first noise attenuator 114.

As mentioned above, the duct 102 also includes a second plurality of acoustic resonators 630. As shown, the second plurality of acoustic resonators 630 can be substantially identical to the first plurality of acoustic resonators 630. However, it will be understood that the second plurality of acoustic resonators 630 can be different from the first plurality of acoustic resonators 510 in one or more aspects. For example, the second plurality of acoustic resonators 630 can have a different number of acoustic resonators than the first plurality of acoustic resonators 610. In another example, the acoustic resonators of the second plurality of acoustic resonators 630 can have different dimensions than the acoustic resonators of the first plurality of acoustic resonators 610.

The second plurality of acoustic resonators 630 is located on one of the other sides 112 of the duct 102 from the first plurality of acoustic resonators 610. For example, as shown, the first plurality of acoustic resonators 610 is located on the first side 112A, and the second plurality of acoustic resonators 630 is located on the third side 112C. However, it should be appreciated that the first plurality of acoustic resonators 610 can be located on the first side 112A, and the second plurality of acoustic resonators 630 can be located on the second side 112B or the fourth side 112D. Moreover, the first plurality of acoustic resonators 610 does not have to be located on the first side 112A. Indeed, the first plurality of acoustic resonators 610 can be located on any side 112 and the second plurality of acoustic resonators 630 can be located on one of any of the other sides 112. The second plurality of acoustic resonators 630 can be positioned with respect to the first plurality of acoustic resonators 610 in any suitable manner. For example, as shown, the second plurality of acoustic resonators 630 is located above the first plurality of acoustic resonators 610. More specifically, the second plurality of acoustic resonators 630 is located directly above the first plurality of acoustic resonators 610 such that one or more of side faces 640 of one or more of the acoustic resonators of the second plurality of acoustic resonators 630 is substantially co-planar with one or more side faces 650 of one or more of the acoustic resonators of the plurality of acoustic resonators 610. However, it should be appreciated that the second plurality of acoustic resonators 630 may be located with respect to the first plurality of acoustic resonators 610 such that the second plurality of acoustic resonators 630 is off set from the first plurality of acoustic resonators 610.

As shown, the second plurality of acoustic resonators 630 is located on the same side 112 as the second noise attenuator 620. Accordingly, the second plurality of acoustic resonators 630 is located at a second distance $D_{6,2}$ from the second noise attenuator 620. The second distance $D_{6,2}$, as shown, is substantially equal to the first distance $D_{6,1}$. However, it will be understood that the second distance $D_{6,2}$ may be different from the first distance $D_{6,1}$. Moreover, it will be understood that the second plurality of acoustic resonators 630 does not have to be located on the same side 112 as the first plurality of acoustic resonators 610.

As described above, the use of the first noise attenuator 114, the first plurality of acoustic resonators 610, the second noise attenuator 620, and the second plurality of acoustic resonators 630 may have a combined, synergistic effect on noise mitigation within the channel 110. The combined sound absorption may depend on the first distance $D_{6,1}$, the second distance $D_{6,2}$, and/or the locations and/or dimensions of each of the first noise attenuator 114, each of acoustic resonators of the first plurality of acoustic resonators 610, the second noise attenuator 620, and each of the acoustic resonators of the second plurality of acoustic resonators 630. These parameters may be adjusted based on the frequency of the sound waves S traveling through the channel 110.

Referring now to FIG. 7, a seventh sound-mitigating device 700 for a duct system according to another form of the present disclosure is shown. As mentioned above, the duct 102 can have a circular cross-section. Accordingly, rather than having sides 112, the duct 102 has a surface 710. As shown, the duct 102 includes a noise attenuator 720 and an acoustic resonator 730. However, it will be appreciated that in one or more arrangements, the duct 102 may include only the noise attenuator 720. In either case, the noise attenuator 720 and/or the acoustic resonator 730 may be formed with the duct 102 such that the noise attenuator 720 and/or the acoustic resonator 730 fit the curved surface 710 of the duct 102. Moreover, while the duct 102, as shown, includes only a noise attenuator 720 and an acoustic resonator 730, it will be understood that the duct 102 can include any of the sound-mitigating components described above in connection with the other variations. For example, the duct 102 can include a second noise attenuator, a second acoustic resonator, a first plurality of acoustic resonators, and/or a second plurality of acoustic resonators.

Figure 8A:
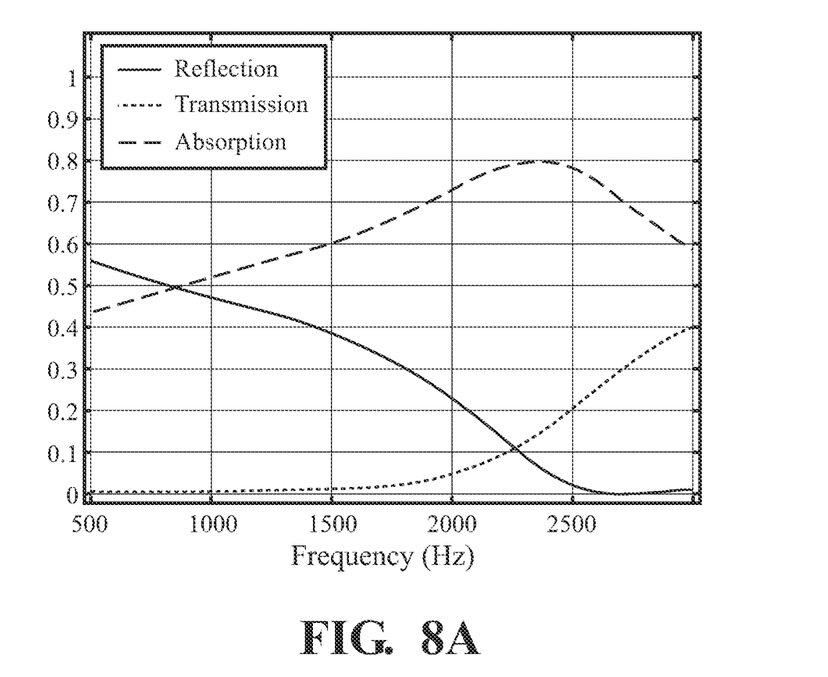
FIG. 8A shows the sound-absorbing performance of a duct having a noise attenuator.
Figure 8B:
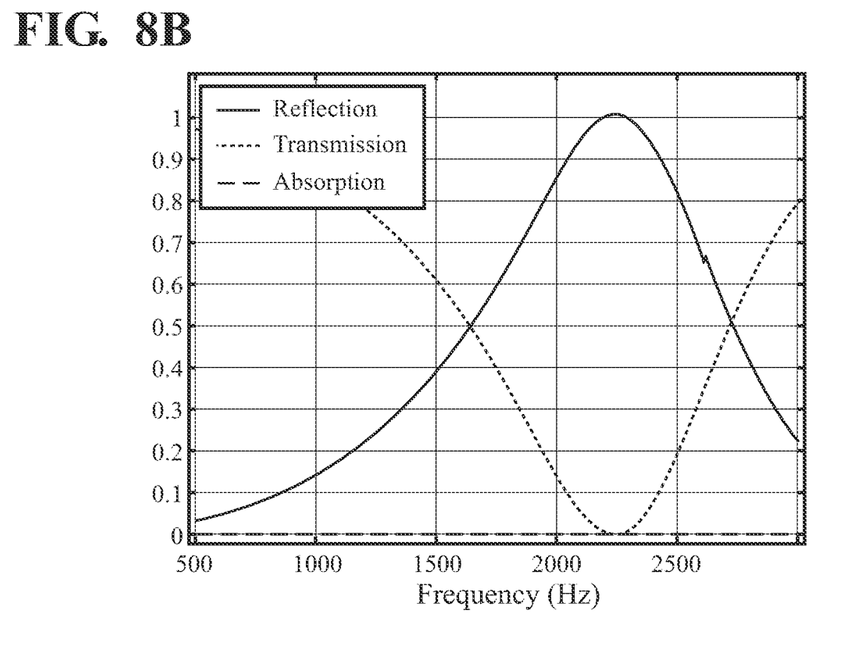
FIG. 8B shows the sound-absorbing performance of a duct having a resonator.
Figure 8C:
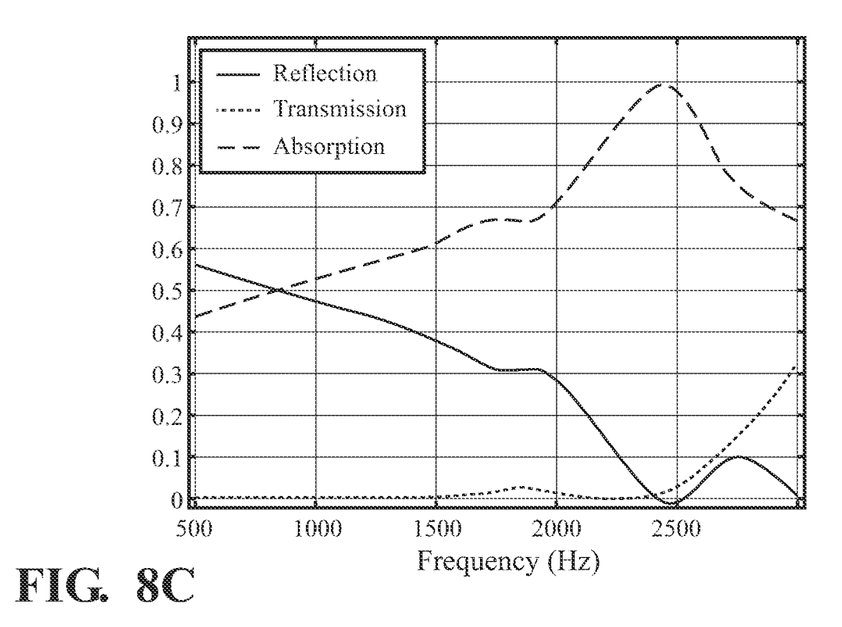
FIG. 8C shows the sound-absorbing performance of a duct having a noise attenuator and a resonator.

Referring now to FIGS. 8A-8C, examples of the simulated performance of some of the above-described components of the duct system are shown. The simulated performance includes the reflection, transmission, and absorption of sound waves traveling through a duct. In each of FIGS. 8A and 8C, the simulated performance is based on a noise attenuator which includes melamine foam as its sound-absorbing material. The melamine foam has a porosity of about 0.995, a flow resistivity of about 10,500 Pa*s/m², a tortuosity of about 1.0059, a viscous characteristic length of about 240 μm, and a thermal characteristic length of about 470 μm. FIG. 8A shows the sound-absorbing performance of a duct having only a noise attenuator. The noise attenuator is the noise attenuator described above in connection with FIGS. 1A-3B. The simulated performance is based on a noise attenuator having a length $L_s$ of 100 mm and a thickness $T_s$ of 10 mm. It can be seen that the noise attenuator exhibits very low noise transmission for a range of frequencies from about 500 Hz to about 2500 Hz. FIG. 8B shows the sound-absorbing performance of a duct having only an acoustic resonator. The acoustic resonator is a quarter-wavelength resonator similar to the quarter-wavelength resonator described above in connection with FIGS. 2A and 2B. The simulated performance is based on a quarter-wavelength resonator having a length $L_q$ of 30 mm and a depth $D_q$ of 34 mm. It can be seen that the acoustic resonator exhibits very low noise transmission for a range of frequencies from about 1700 Hz to about 2700 Hz. FIG. 8C shows the sound-absorbing performance of a duct having both a noise attenuator and an acoustic resonator. The noise attenuator is the noise attenuator used in the simulation shown in FIG. 8A, and the acoustic resonator is the acoustic resonator used in the simulation shown in FIG. 8B. It can be seen that the noise attenuator and acoustic resonator exhibit very low noise transmission for a range of frequencies from about 500 Hz to about 3000 Hz.

Figure 9:
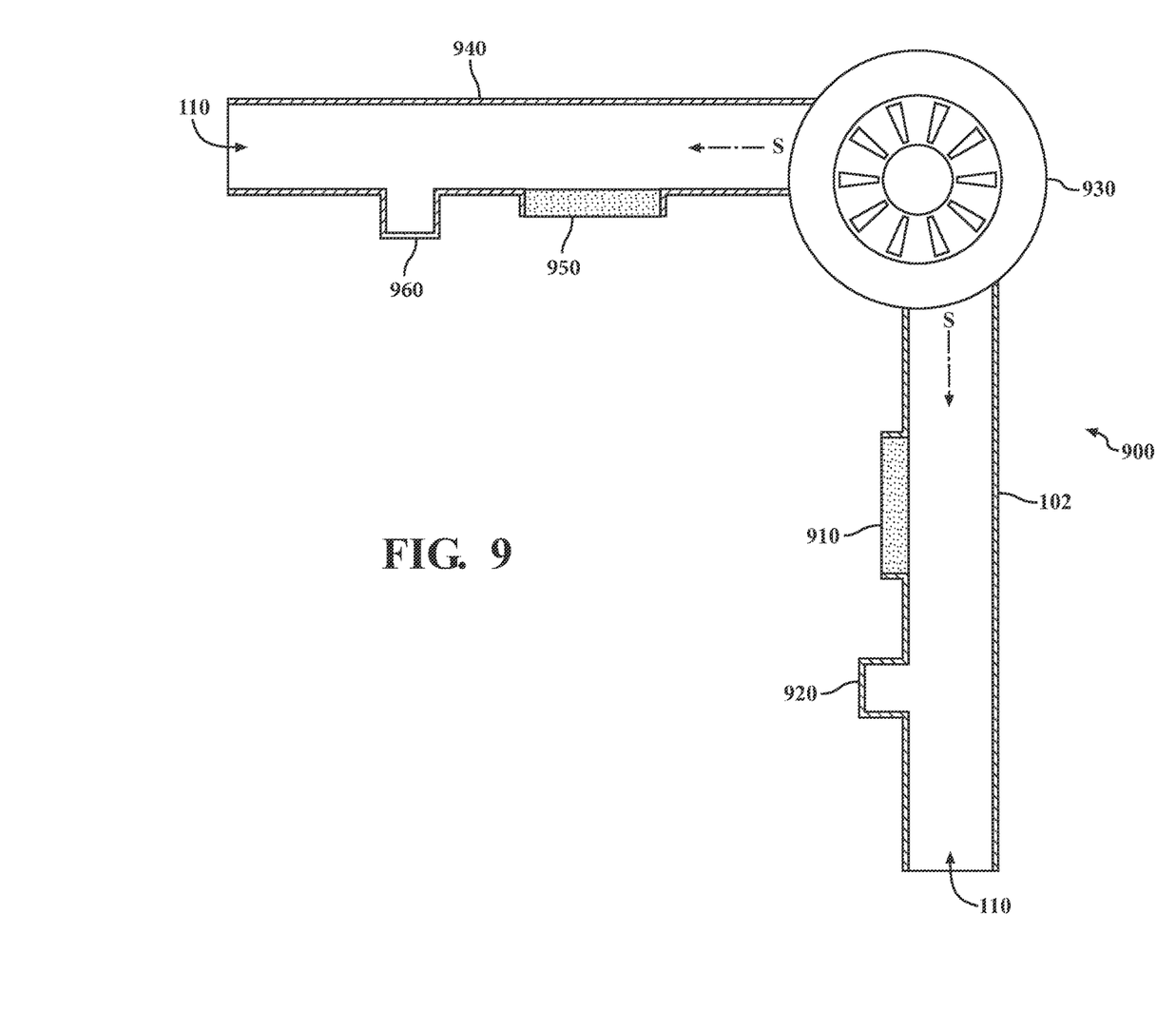
FIG. 9 shows a duct used in connection with an HVAC system.

Referring now to FIG. 9, the duct 102 can be a component of a heating, ventilating, and air-conditioning (HVAC) system 900. As shown, the duct 102 is a first duct 102 that includes a first noise attenuator 910 and a first acoustic resonator 920. However, it will be appreciated that the first duct 102, in one or more arrangements, may include only the first noise attenuator 910. The first noise attenuator 910 can be any of the above-described noise attenuators, and the first acoustic resonator 920 can be any of the above-described acoustic resonators. The HVAC system 900 includes a blower 930, which can be configured to blow air or other gas through the channel 110. Passage of air or other gas along the channel 110 generates sound waves S traveling in the same direction as the air or other gas, and the first noise attenuator 910 and the first acoustic resonator 920 can be configured to absorb and reflect, respectively, the sound waves S to mitigate noise generated within the channel 110. While the first duct 102 as shown in FIG. 9 includes only the first noise attenuator 910 and the first acoustic resonator 920, it will be understood that the first duct 102 can include any of the sound-mitigating components described above in connection with the other variations. For example, the first duct 102 can include any suitable number of noise attenuators and/or acoustic resonators.

The HVAC system 900 can optionally include a second duct 940. Like the first duct 102, the second duct 940 includes a second noise attenuator 950 and a second acoustic resonator 960. However, it will be appreciated that the second duct 940, in one or more arrangements, may include only the second noise attenuator 950. The second noise attenuator 950 can be any of the above-described noise attenuators, and the second acoustic resonator 960 can be any of the above-described acoustic resonators. Though the HVAC system 900 may be configured to blow air or other gas along the channel 110, in some instances, sound waves S may travel in substantially the opposite direction. Accordingly, the second noise attenuator 950 and the second acoustic resonator 960 can be configured to absorb and reflect, respectively, the sound waves S to mitigate noise generated within the channel 110. While the second duct 940 as shown in FIG. 9 includes only the second noise attenuator 950 and the second acoustic resonator 960, it will be understood that the second duct 940 can include any of the sound-mitigating components described above in connection with the other variations. For example, the second duct 102 can include any suitable number of noise attenuators and/or acoustic resonators.

The variations described herein have the advantage of mitigating noise propagation within a duct system, for example, within a duct of an HVAC system. The variations described herein have the added advantage of reducing the amount of foam-based materials needed to mitigate noise propagation in standard duct systems, which may require the use of a high amount of foam-based materials, which can become heavy and/or costly. Accordingly, the variations described herein have the advantage of mitigating noise propagation in a duct while keeping the weight and/or the cost of the noise-mitigating materials relatively low.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations, means that a particular feature, structure, or characteristic described in connection with a form, a variation, or a particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A duct, comprising:
   a duct body forming a muffler for a vehicle and defining an inlet, an outlet, and a channel connecting the inlet and the outlet, the duct body being configured to direct gas flowing within the channel from the inlet to the outlet and further defining:
      an opening located between the inlet and the outlet; and
      one or more sidewalls located about the opening, defining a sidewall perimeter, and extending from the duct body toward an external environment of the duct body; and
   a noise attenuator including sound-absorbing material covering the opening, defining a perimeter larger than the sidewall perimeter such that the noise attenuator is housed within the one or more sidewalls through press-fitting, and defining a pair of first faces and a pair of second faces that are larger than the first faces, wherein at least one of the second faces is entirely in direct contact with an external environment of the duct body, the sound-absorbing material being configured to dissipate acoustic energy within the channel to reduce sound created by an engine of the vehicle.

2. The duct of claim 1, wherein the sound-absorbing material is porous and is at least one of a foam-based material and a metallic material.

3. The duct of claim 2, wherein the sound-absorbing material is melamine.

4. The duct of claim 1, further comprising:
   an acoustic resonator located downstream of the noise attenuator and configured to further dissipate acoustic energy within the channel.

5. The duct of claim 4, wherein the acoustic resonator is at least one of a quarter-wavelength resonator and a Helmholtz resonator.

6. The duct of claim 4, wherein the duct body has a rectangular-shaped cross section, and wherein the noise attenuator and the acoustic resonator are located on a same side of the duct body.

7. The duct of claim 6, wherein the noise attenuator is a first noise attenuator, wherein the acoustic resonator is a first acoustic resonator, and further comprising:
   a second noise attenuator located on an opposite side of the duct body above the first noise attenuator and configured to further dissipate acoustic energy within the channel; and
   a second acoustic resonator located on the opposite side of the duct body above the first acoustic resonator and configured to further dissipate acoustic energy within the channel.

8. The duct of claim 1, further comprising:
   a plurality of acoustic resonators located downstream of the noise attenuator and configured to further dissipate acoustic energy within the channel, wherein each of the plurality of acoustic resonators has a different depth.

9. The duct of claim 8, wherein the noise attenuator is a first noise attenuator, wherein the plurality of acoustic resonators is a first plurality of acoustic resonators, and further comprising:
   a second noise attenuator located on an opposite side of the duct body above the first noise attenuator and configured to further dissipate acoustic energy within the channel; and
   a second plurality of acoustic resonators located on an opposite side of the duct body above the first plurality of acoustic resonators and configured to further dissipate acoustic energy within the channel, wherein each of the plurality of acoustic resonators has a different depth.

10. The duct of claim 1, wherein the duct has a circular cross-section, and wherein the noise attenuator is formed with the duct such that the noise attenuator fits a curved surface of the duct.

11. A duct, comprising:
    a duct body forming a muffler for a vehicle and defining an inlet, an outlet, and a channel connecting the inlet and the outlet, the duct body being configured to direct gas flowing within the channel from the inlet to the outlet and further defining:
       an opening located between the inlet and the outlet; and
       one or more sidewalls located about the opening, defining a sidewall perimeter, and extending from the duct body toward an external environment of the duct body;
    a noise attenuator including sound-absorbing material covering the opening, defining a perimeter larger than the sidewall perimeter such that the noise attenuator is housed within the one or more sidewalls through press-fitting, and defining a pair of first faces and a pair of second faces that are larger than the first faces, wherein at least one of the second faces is entirely in direct contact with an external environment of the duct body, the sound-absorbing material being configured to dissipate acoustic energy within the channel to reduce sound created by an engine of the vehicle; and
    an acoustic resonator located downstream of the noise attenuator and configured to further dissipate acoustic energy within the channel, where the acoustic resonator is at least one of a quarter-wavelength resonator and a Helmholtz resonator.

12. The duct of claim 11, wherein the sound-absorbing material is porous and is at least one of a foam-based material and a metallic material.

13. The duct of claim 12, wherein the sound-absorbing material is melamine.

14. The duct of claim 11, wherein the duct body has a rectangular-shaped cross section, and wherein the noise attenuator and the acoustic resonator are located on a same side of the duct body.

15. The duct of claim 11, wherein the noise attenuator is a first noise attenuator, wherein the acoustic resonator is a first acoustic resonator, and further comprising:
- a second noise attenuator located on an opposite side of the duct body above the first noise attenuator and configured to further dissipate acoustic energy within the channel; and
- a second acoustic resonator located on the opposite side of the duct body above the first acoustic resonator and configured to further dissipate acoustic energy within the channel.

16. The duct of claim 11, further comprising:
- a plurality of acoustic resonators located downstream of the noise attenuator and configured to further dissipate acoustic energy within the channel, wherein each of the plurality of acoustic resonators has a different depth.

17. The duct of claim 16, wherein the noise attenuator is a first noise attenuator, wherein the plurality of acoustic resonators is a first plurality of acoustic resonators, and further comprising:
- a second noise attenuator located on an opposite side of the duct body above the first noise attenuator and configured to further dissipate acoustic energy within the channel; and
- a second plurality of acoustic resonators located on an opposite side of the duct body above the first plurality of acoustic resonators and configured to further dissipate acoustic energy within the channel, wherein each of the plurality of acoustic resonators has a different depth.

18. The duct of claim 11, wherein the duct has a circular cross-section and wherein the noise attenuator and the acoustic resonator are formed with the duct such that the noise attenuator and the acoustic resonator fit a curved surface of the duct.

19. The duct of claim 1, wherein the noise attenuator defines an outer face that faces opposite the channel and is flush with a height of the one or more sidewalls.

20. The duct of claim 11, wherein the noise attenuator defines an outer face that faces opposite the channel and is flush with a height of the one or more sidewalls.

21. A device, comprising:
- a vehicle muffler having a duct defining:
  - a channel connecting an inlet and an outlet,
  - an opening located between the inlet and the outlet, and
  - a sidewall surrounding the opening, defining a sidewall perimeter, and extending toward an external environment of the duct; and
- a noise attenuator including sound-absorbing material that covers the opening, dissipates sound within the channel created by an engine of the vehicle, defines a perimeter larger than the sidewall perimeter such that the noise attenuator is housed within the sidewall through press-fitting, and defines a pair of first faces and a pair of second faces that are larger than the first faces with one of the second faces in entirely direct contact with the external environment.

* * * * *